(12) United States Patent
Francis et al.

(10) Patent No.: US 10,844,990 B1
(45) Date of Patent: Nov. 24, 2020

(54) REPAIR SYSTEM AND METHOD

(71) Applicant: Trinity Bay Equipment Holdings, LLC, Houston, TX (US)

(72) Inventors: Kirk Spencer Francis, Richmond, TX (US); Dale Brian Marietta, Katy, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/805,627

(22) Filed: Feb. 28, 2020

(51) Int. Cl.
*F16L 55/168* (2006.01)

(52) U.S. Cl.
CPC .................. *F16L 55/1683* (2013.01)

(58) Field of Classification Search
CPC ........ F16L 55/16; F16L 55/162; F16L 55/163
USPC ............................ 138/99, 97; 156/94, 95, 98
See application file for complete search history.

(56) References Cited

U.S. PATENT DOCUMENTS

| | | | | |
|---|---|---|---|---|
| 2,224,918 A | * | 12/1940 | Merrill | F16L 55/172 138/99 |
| 5,735,227 A | * | 4/1998 | Goulding | B63B 43/16 114/227 |
| 2012/0000596 A1 | * | 1/2012 | Walsh | B29C 73/06 156/95 |
| 2012/0132344 A1 | * | 5/2012 | Deleris | B29C 73/10 156/98 |

* cited by examiner

*Primary Examiner* — Patrick F Brinson
(74) *Attorney, Agent, or Firm* — Fletcher Yoder PC

(57) ABSTRACT

A method of repairing a flexible pipe within a carrier pipe. The method then increases a first area of a first hole in the carrier pipe. The method then bends a first layer of the flexible pipe around a second hole in the first layer. The method then patches a third hole in a second layer of the flexible pipe.

20 Claims, 8 Drawing Sheets

REPAIR SYSTEM AND METHOD

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In some places, pipeline operators could experience fuel theft through illegal tapping of their pipelines. Thieves may steal the fuel by digging to reach a buried pipeline and then drilling a hole in the pipe. The release of fuel through the hole may be collected with hoses and buckets for use by the thieves or sold on the black market. These illegal taps result in fuel loss and spillage that damages the environment, and may affect the structural integrity of the pipelines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Instead of or in addition to digging up a pipeline or digging new trenches to install new pipeline, flexible pipe may be installed into existing pipeline infrastructure. Indeed, flexible pipe is durable and operational in harsh operating conditions and can accommodate high pressures and temperatures. In the event that even the flexible pipe is tapped or damaged, however, holes in the flexible pipe after installation inside other pipeline infrastructure may be repaired.

In one example, the disclosure describes a method of repairing a flexible pipe within a carrier pipe. The method then increases a first area of a first hole in the carrier pipe. The method then bends a first layer of the flexible pipe around a second hole in the first layer. The method then patches a third hole in a second layer of the flexible pipe.

In another example, the disclosure describes a pipe system that includes a carrier pipe and a flexible pipe within the carrier pipe. The flexible pipe includes a first layer of material and a second layer of material surrounding the first layer of material. The second layer of material includes metal. A seal system seals a first hole in the carrier pipe. The seal system includes a seal body that couples to the carrier pipe. The seal body defines a first port and a second port. The first port receives a material that fills an annulus formed between the carrier pipe and the flexible pipe. The second port releases gas between the flexible pipe and the carrier pipe.

In another example, the disclosure describes a seal system includes a seal body that couples to a carrier pipe. The seal body defines a first port and a second port. The first port receives a material that fills an annulus formed between the carrier pipe and a flexible pipe. The second port releases gas between the flexible pipe and the carrier pipe as the annulus fills with the material.

Other aspects and advantages of the claimed subject matter will be apparent from the following description and the appended claims.

DETAILED DESCRIPTION

Figure 1:
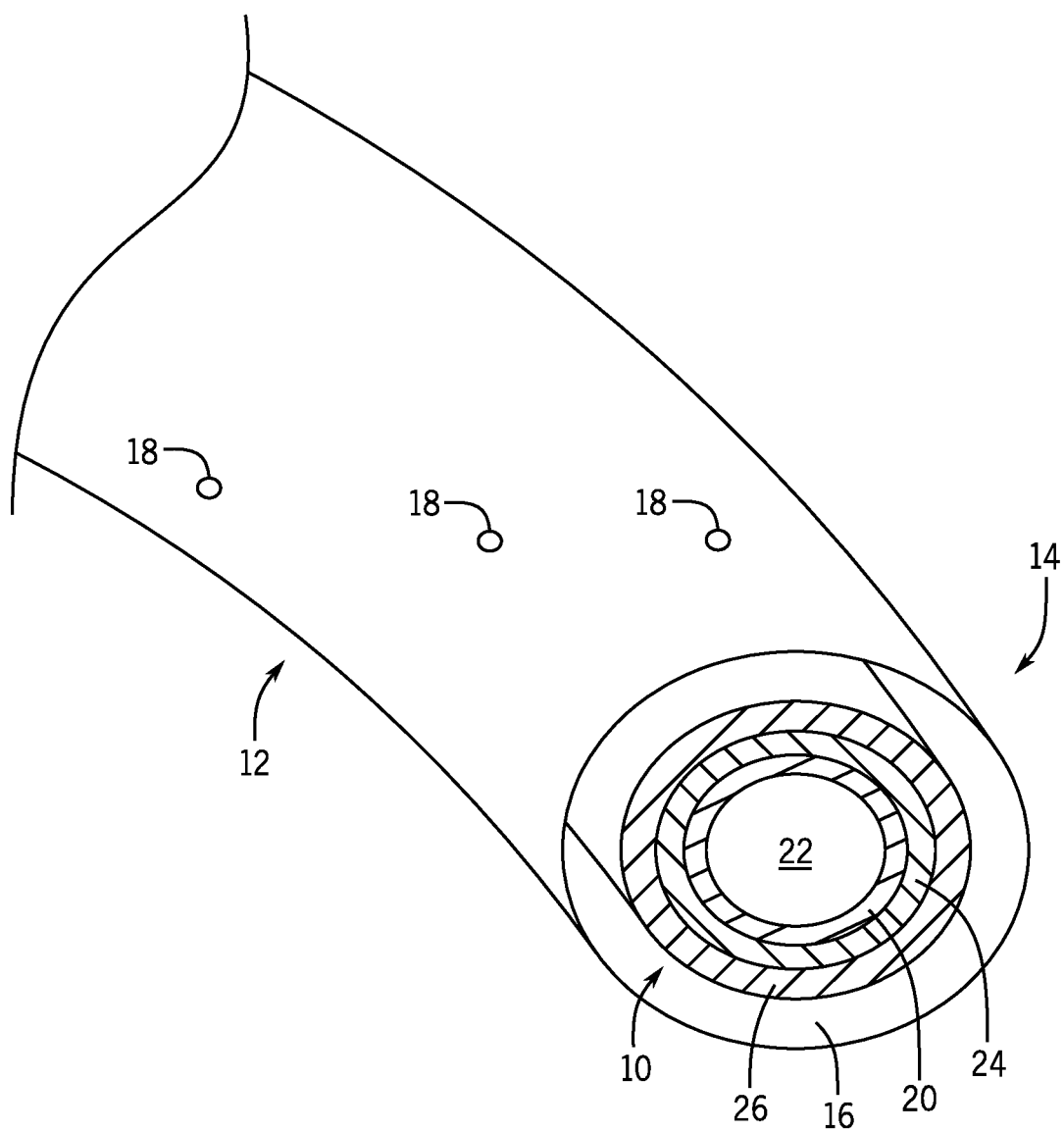
FIG. 1 is a perspective cross-sectional view of a flexible pipe installed within a carrier pipe, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As explained above, pipeline operators may experience fuel theft through illegal tapping of their pipelines. These illegal taps result in fuel loss, spillage that damages the environment, and may affect the structural integrity of the pipelines. However, instead of digging up the existing pipeline or digging new trenches to install new pipeline, flexible pipe is installed inside the existing pipeline. The existing pipeline then becomes a carrier pipe that provides a conduit for the rapid deployment of flexible pipe. However, the ability to seal holes in the flexible pipe presents a significant challenge. Specifically, the structure of the flexible pipe may limit the type of repairs that may be performed. As will be explained below, flexible pipe may consist of multiple layers of polymers (e.g., high density polyethylene) that encase one or more layers of metal strips (e.g., steel). Accordingly, patching an illegal tap presents the challenge of sealing a hole through multiple layers of different materials. In contrast, existing steel pipelines may be repaired by simply welding a plate to the steel pipe over the hole. The disclosure below describes a repair system and method that enables repair of flexible pipe, such as when the flexible pipe is disposed within an existing carrier pipe. And as will be explained in greater detail, the repair method and repair system use the unique arrangement of flexible pipe within a carrier pipe to enable sealing and repair of the flexible pipe.

FIG. 1 is a perspective cross-sectional view of a flexible pipe 10 (e.g., conduit) installed within a carrier pipe 12 (e.g., conduit) to form a pipeline infrastructure or pipe system 14. The carrier pipe 12 defines a bore 16 that receives the flexible pipe 10 during installation. Placing flexible pipe 10 within an existing pipe may save time and money by reducing and/or eliminating the construction of trenches and/or other infrastructure for laying flexible pipe. In some situations, the carrier pipe 12 may already be buried below the surface. However, fuel thieves may still drill holes 18 in the carrier pipe 12 in order to steal fuel. Once thieves realize that the carrier pipe 12 is dry, they may drill into the flexible pipe 10 to access the fuel. Drilling through the flexible pipe 10 involves drilling through multiple layers of material. For example, the flexible pipe 10 may include a first or inner layer 20 that may be made from a thermoplastic (e.g., high density polyethylene (HDPE)). The inner layer 20 defines a bore 22 that carries a fluid (e.g., fuel). Surrounding the inner layer 20 is a second or middle layer 24 that may be made from a metal(s) (e.g., steel strips) that provides strength to the flexible pipe 10. And surrounding the middle layer 24 may be a third or outer layer 26 made from a thermoplastic (e.g., HDPE). The inner layer 20 and the outer layer 26 may protect the middle layer from fluids within the bore 22 as well as from fluids and substances outside of the flexible pipe 10. For example, the inner layer 20 and the outer layer 26 may protect the middle layer 24 from corrosion.

It should be understood that flexible pipe 10 is a tube that conveys or transfers any water, gas, oil, or any type of suitable fluid. The flexible pipe 10 may be made of any type of materials including plastics, metals, composites (e.g., fiber-reinforced composites), and/or other suitable materials. The flexible pipe 10 may include Bonded or Unbonded Flexible Pipe, Flexible Composite Pipe (FCP), Thermoplastic Composite Pipe (TCP) or Reinforced Thermoplastic Pipe (RTP). FCP or RTP pipe may itself be generally composed of several layers. In one or more embodiments, a flexible pipe may include a thermoplastic liner or internal pressure sheath having a reinforcement layer and a thermoplastic outer cover layer. In one or more embodiments, the thermoplastic may be high density polyethylene (HDPE). Thus, flexible pipe may include different layers that may be made of a variety of materials and may also provide corrosion resistance. For example, in one or more embodiments, pipe used to make up a coil of pipe may have a corrosion protection outer cover layer that is disposed over another layer of steel reinforcement. In this embodiment, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed and re-usability. Another type of flexible or spoolable pipe is coiled tubing or reeled tubing, which may be made of steel and have corrosion protection shield layer.

Figure 2:
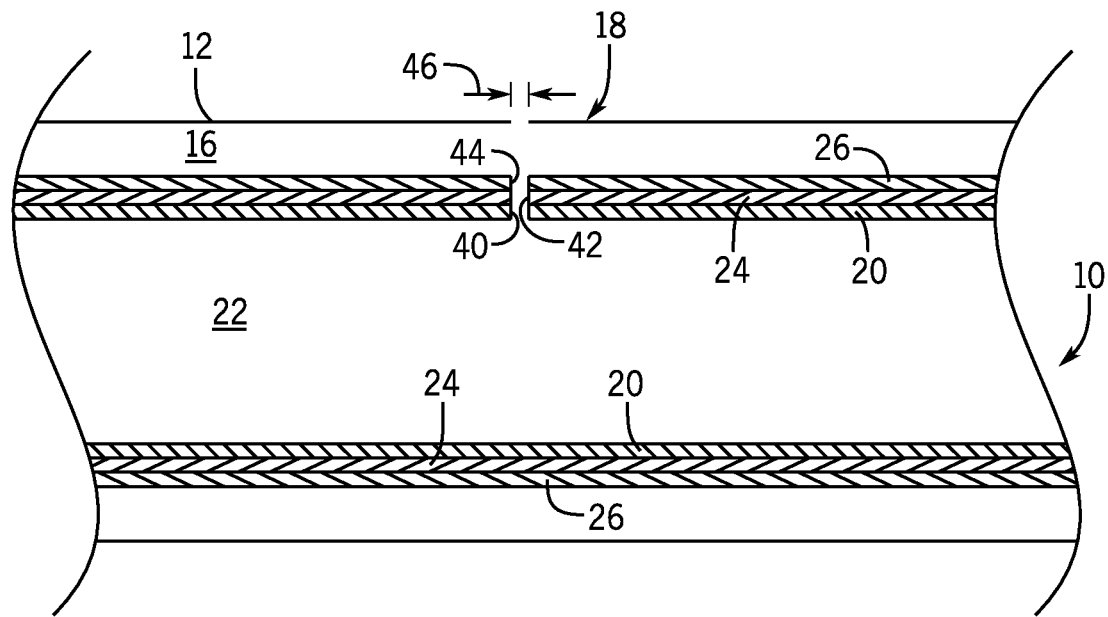
FIG. 2 is a cross-sectional side view of a flexible pipe within a carrier pipe with a hole drilled through the carrier pipe and the flexible pipe, according to embodiments of the present disclosure.

FIG. 2 is a cross-sectional side view of the flexible pipe 10 within the carrier pipe 12. The carrier pipe 12 defines an aperture or hole 18 and the flexible pipe 10 similarly defines holes or holes 40, 42, and 44 having a cross-sectional area or diameter 46 within the respective layers 20, 24, and 26 (e.g., first layer, second layer, third layer). These holes 18, 40, 42, and 44 may be formed by a thief drilling a hole to access fuel carried in the bore 22 of the flexible pipe 10. After the thief drills the holes 18, 40, 42, and 44 through the carrier pipe 12 and the flexible pipe 10, the holes 18, 40, 42, and 44 may have a similar cross-sectional area or diameter. As will be explained below, the method of repairing the flexible pipe 10 involves changing these initial diameters.

Figure 3:
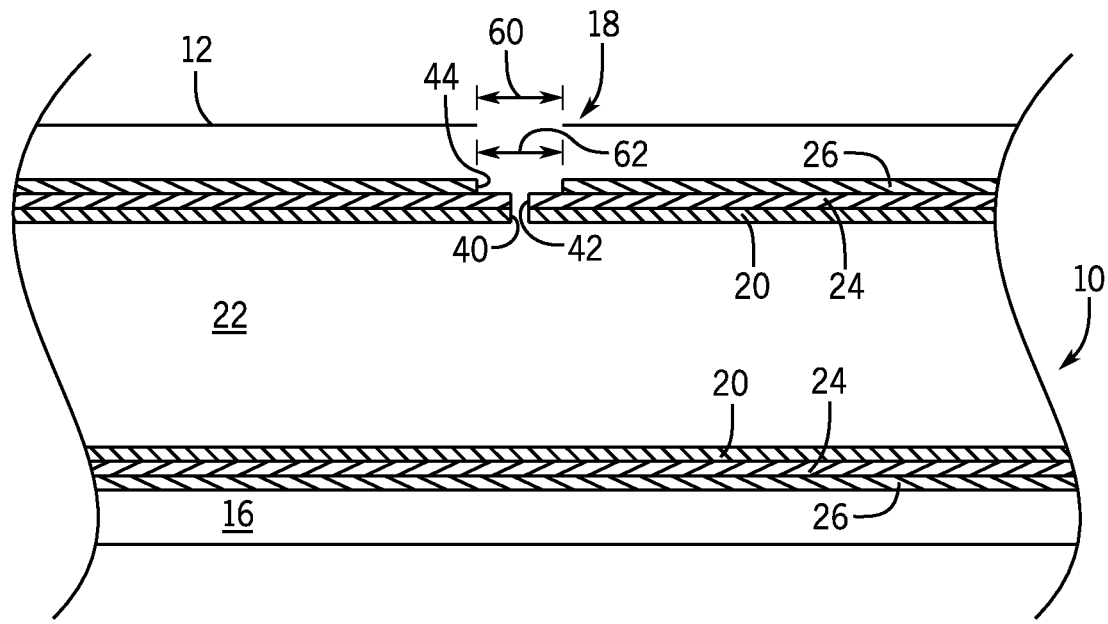
FIG. 3 is a cross-sectional side view of the flexible pipe within the carrier pipe seen in FIG. 1 after widening the hole in the carrier pipe, according to embodiments of the present disclosure.

FIG. 3 is a cross-sectional side view of the flexible pipe 10 within the carrier pipe 12 seen in FIG. 1. The method of repairing the flexible pipe 10 may begin with increasing a cross-sectional area or diameter 60 of the hole 18 to form an access port or window. Increasing the size of hole 18 facilitates access to and insertion of tools or equipment into the bore 16 of the carrier pipe 12. The size of the hole 18 may be increased by cutting the carrier pipe 12 using cold cutting or hot cutting techniques. In some situations, it may be desirable to cold cut the carrier pipe 12 when increasing the size of the hole 18 to block or reduce combustion of fuel or fumes within the flexible pipe 10 or carrier pipe 12. In some embodiments, after increasing the size of the hole 18, the repair method involves increasing a cross-sectional area or diameter 62 of the hole 44. Clearing away material of the outer layer 26 exposes the material (e.g., metal, steel strips) of the middle layer 24 surrounding the hole 42.

Figure 4:
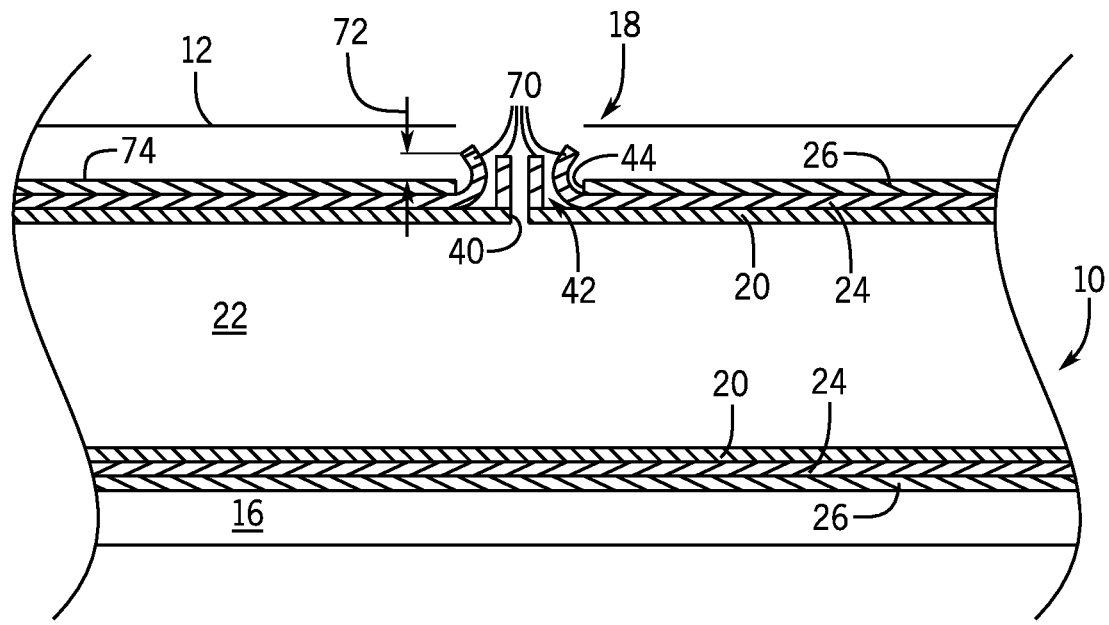
FIG. 4 is a cross-sectional side view of the flexible pipe within the carrier pipe seen in FIG. 3 with the metal layer of the flexible pipe pulled or bent away from the hole, according to embodiments of the present disclosure.

FIG. 4 is a cross-sectional side view of the flexible pipe 10 within the carrier pipe 12 seen in FIG. 3. After clearing/removing material from the outer layer 26 surrounding the hole 44, the material of the middle layer 24 may be bent or pulled back. For example, the middle layer 24 may be a metal (e.g., steel, steel strips). The bending or pulling of the material of the middle layer 24 forms protrusions 70 that project away from the outer layer 26 and increase the size of the hole 42. These protrusions 70 may extend a distance 72 (e.g., 0.5-5 inches, 1-3 inches, 1-2 inches, 0.5 inches) beyond the outermost surface of the outer layer 26. As will be explained below, the protrusions 70 may enable the flexible pipe 10 to handle tensile loads while carrying a pressurized fluid (e.g., fuel).

Figure 5:
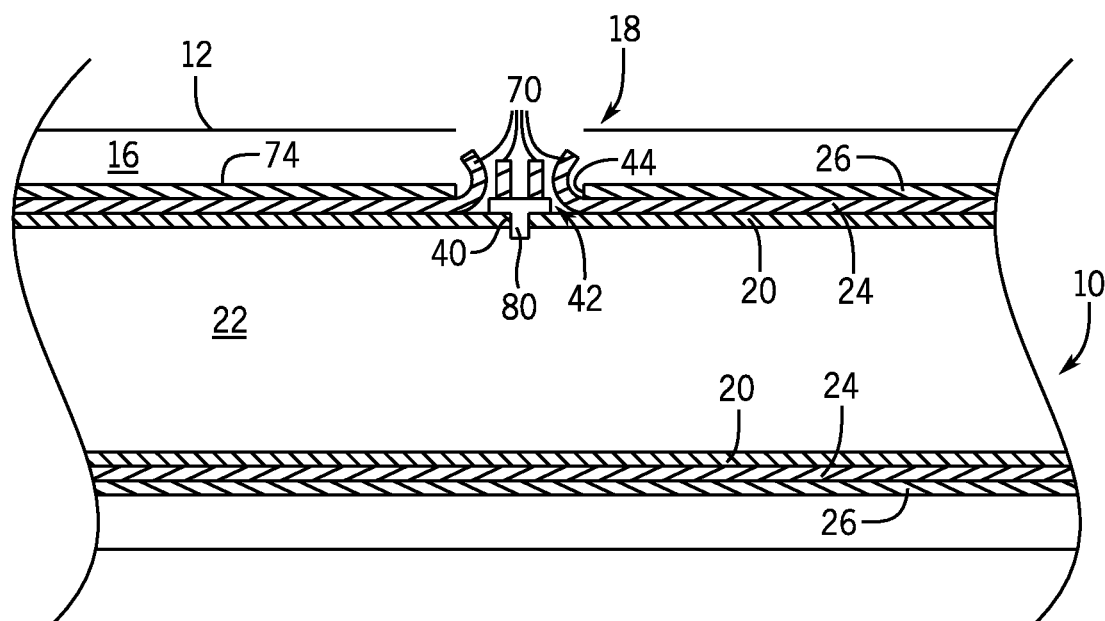
FIG. 5 is a cross-sectional side view of the flexible pipe within the carrier pipe seen in FIG. 4 with a plug installed in the hole of the innermost layer of the flexible pipe, according to embodiments of the present disclosure.

FIG. 5 is a cross-sectional side view of the flexible pipe 10 within the carrier pipe 12 seen in FIG. 4. The repair method seen in FIG. 4 continues in FIG. 5 by blocking the hole 40. In some embodiments, a tapered or threaded pipe plug 80 may be installed to seal the hole 40. The repair method may also include prepping the hole 40 by drilling or trimming the inner layer 20 around the aperture. For example, drilling or trimming around the hole 40 may size and/or prepare the inner layer 20 to receive the pipe plug 80.

Figure 6:
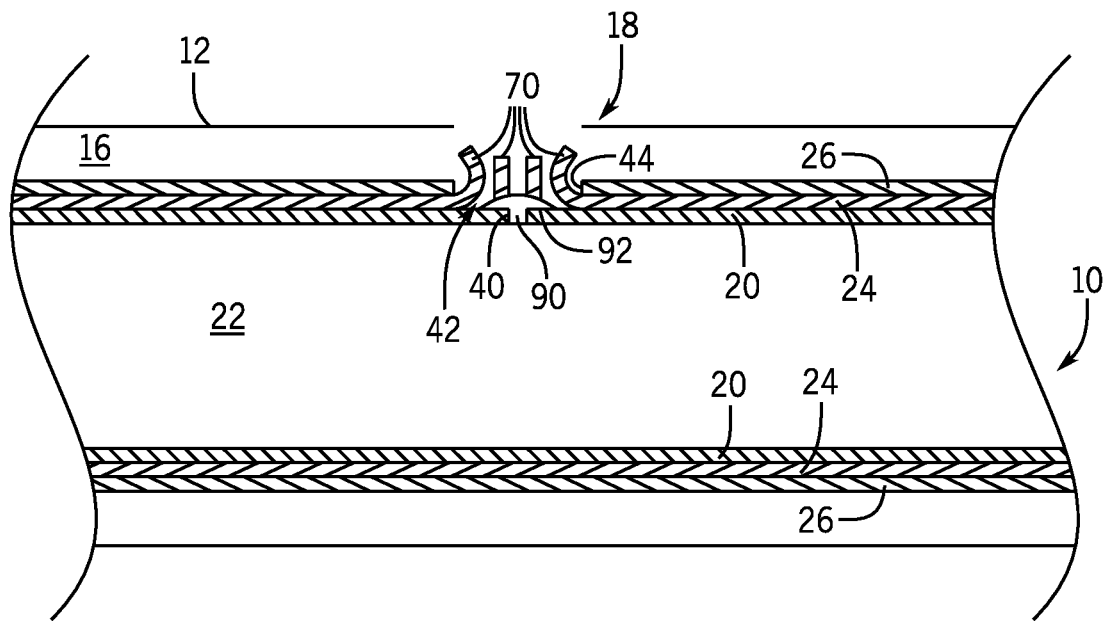
FIG. 6 is a cross-sectional side view of the flexible pipe within the carrier pipe seen in FIG. 4 with an electrofusion or welded patch covering the hole of the innermost layer of the flexible pipe, according to embodiments of the present disclosure.

FIG. 6 is a cross-sectional side view of the flexible pipe 10 within the carrier pipe 12 seen in FIG. 4. In some embodiments, the repair method may involve electrofusing or welding a patch 90 to seal the hole 40. In some embodiments, the patch 90 may extend beyond the cross-sectional area of the hole 40 where the patch 90 couples to the outer surface 92 of the inner layer 20.

Figure 7:
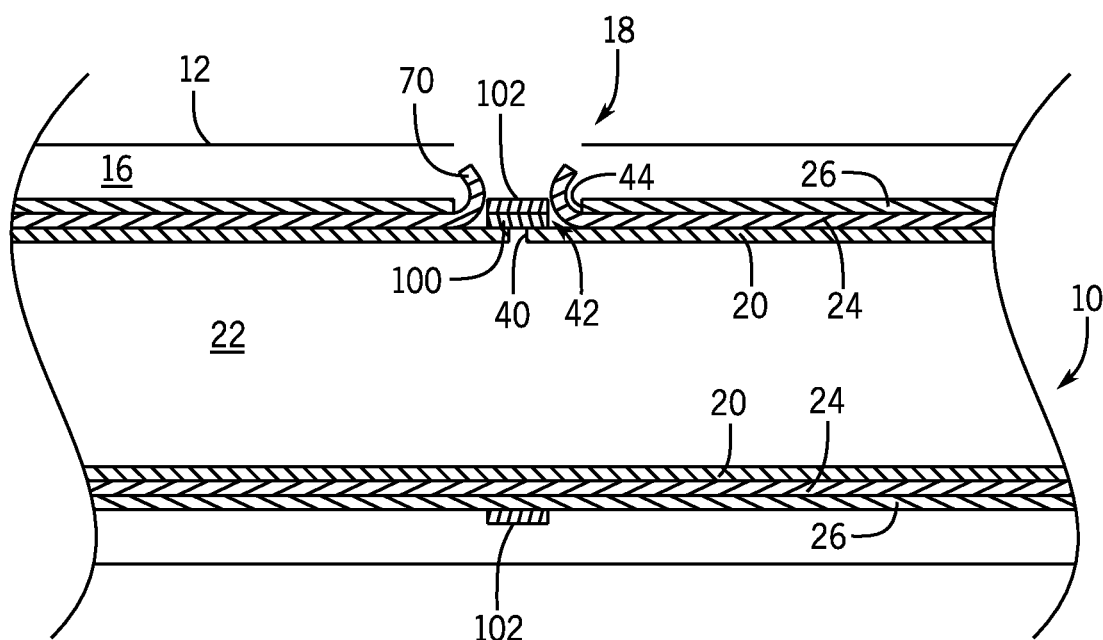
FIG. 7 is a cross-sectional side view of the flexible pipe within the carrier pipe seen in FIG. 4 with a gasket over the hole of the innermost layer of the flexible pipe and secured in place with a band clamp, according to embodiments of the present disclosure.

FIG. 7 is a cross-sectional side view of the flexible pipe 10 within the carrier pipe 12 seen in FIG. 4. In some embodiments, the repair method may secure a gasket 100 over the hole 40. For example, the gasket 100 may be secured in place with a clamp 102. The clamp 102 may be a band clamp that extends around the flexible pipe 10 to hold the gasket 100 in place. In some embodiments, in order to place the clamp 102 around the flexible pipe 10, some of the protrusions 70 (e.g., circumferential protrusions) may be trimmed or cutoff to facilitate contact between the clamp 102 and the gasket 100. In this way, the clamp 102 may provide the compressive force for sealing the gasket 100 against the inner layer 20.

Figure 8:
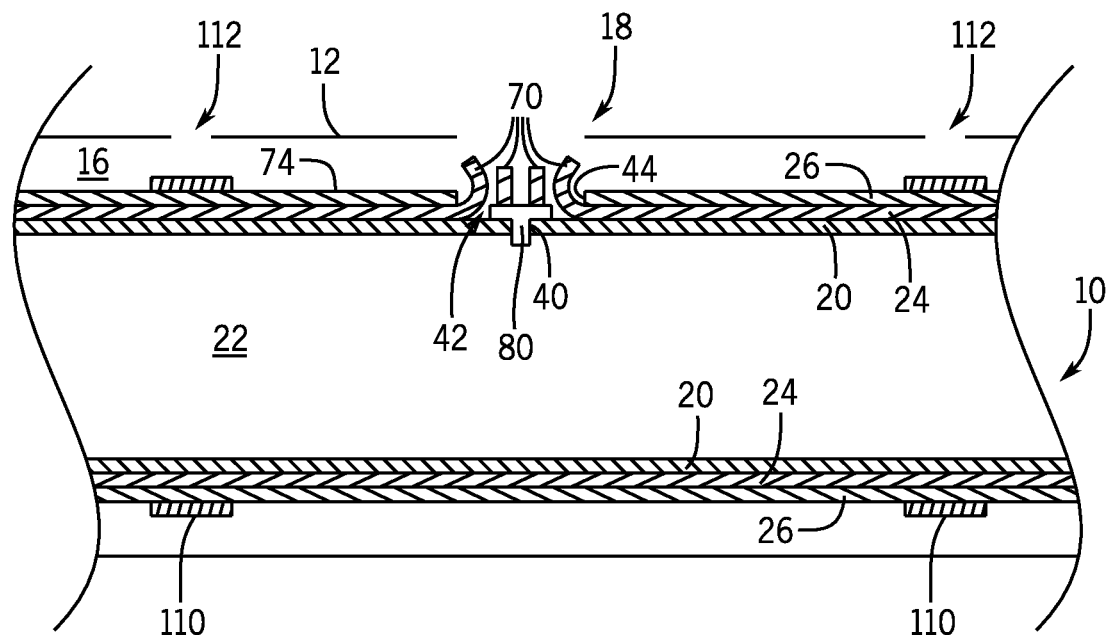
FIG. 8 is a cross-sectional side view of the flexible pipe within the carrier pipe seen in FIG. 5 with seals placed around the flexible pipe upstream and downstream of the hole, according to embodiments of the present disclosure.

FIG. 8 is a cross-sectional side view of the flexible pipe 10 within the carrier pipe 12 seen in FIG. 5. As will be explained in FIGS. 9 and 10, in order to maintain the seal over the hole 40 as well as to discourage further attempts to reopen the hole 40, a material (e.g., cement, epoxy) may be injected into the bore 16 between the flexible pipe 10 and the carrier pipe 12. To block the material from flowing excessively upstream and/or downstream from the location of the hole 40, the repair method includes placing temporary seals 110 in the bore 16. The seals 110 are placed upstream and downstream from the hole 40 and circumferentially extend about the exterior surface 74 of the outer layer 26 to form a seal between the carrier pipe 12 and flexible pipe 10. For example, the seals 110 may be placed 1-6 inches, 1-12 inches, 1-24 or more both upstream and downstream from the axis of the hole 40. The seals 110 may be a rubber seal, a plastic seal, a foam seal, a swellable seal (e.g., absorbent polymer), among others. The seals 110 in FIG. 8 may be foam or swellable seals that expand to fill the bore 16 between the flexible pipe 10 and the carrier pipe 12. In some embodiments, apertures 112 may be made in the carrier pipe 12 to facilitate placement of the temporary seals 110 in the bore 16. In other embodiments, the seals 110 may be inserted through the hole 18 and positioned with tools.

Figure 9:
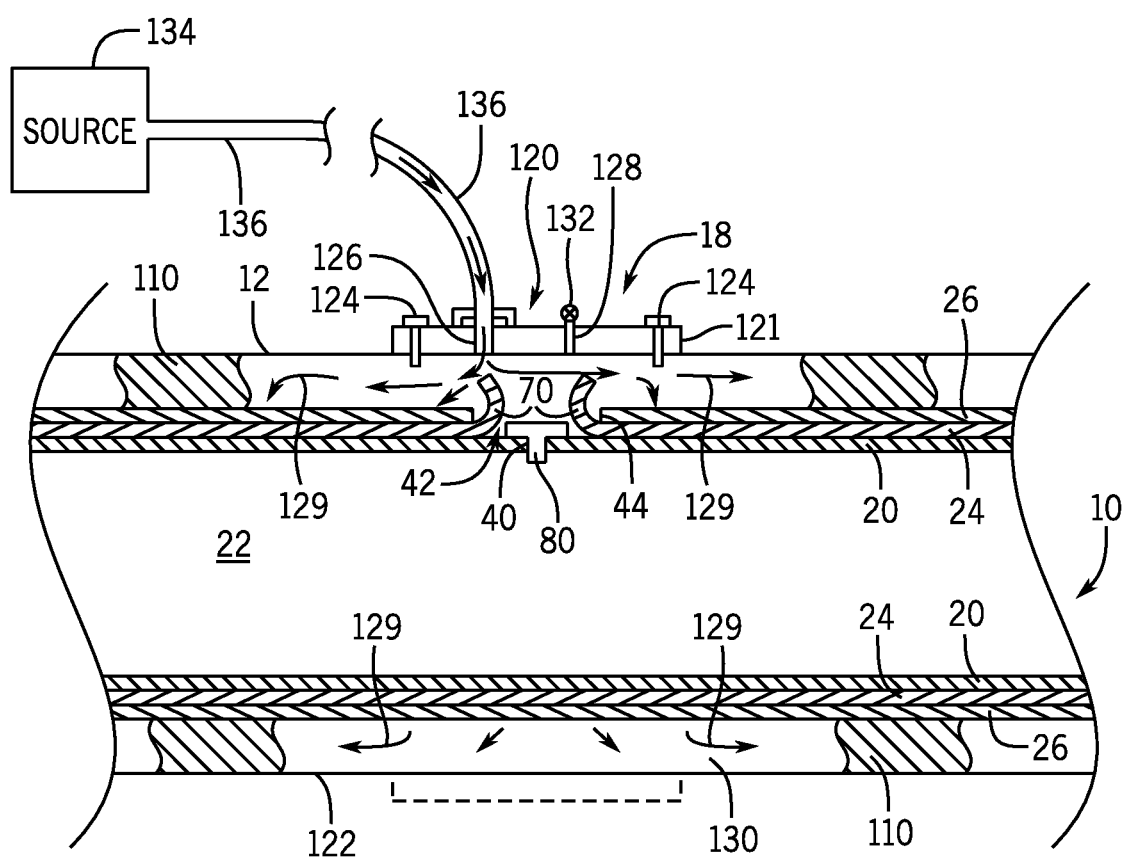
FIG. 9 is a cross-sectional side view of the flexible pipe within the carrier pipe seen in FIG. 8 with seals placed around the flexible pipe upstream and downstream of the hole and a seal system coupled to an exterior surface of the carrier pipe, according to embodiments of the present disclosure.

FIG. 9 is a cross-sectional side view of the flexible pipe 10 within the carrier pipe 12 seen in FIG. 8. As illustrated, the seals 110 form a seal between the flexible pipe 10 and the carrier pipe 12. For example, foam seals may have expanded and hardened or swellable seals may have absorbed a fluid that enabled them to expand and harden. Once the seals 110 are in place and have formed a seal between the flexible pipe 10 and the carrier pipe 12, the repair method continues by coupling a seal system 120 over the hole 18 in the carrier pipe 12. The seal system 120 includes a seal body 121 that couples to the exterior surface 122 and in some embodiments may wrap around the circumference of the carrier pipe 12. In another embodiment, the seal body 121 may be welded to the carrier pipe 12. In still other embodiments, the seal body 121 may be bolted to the carrier pipe 12 with bolts 124.

The seal body 121 defines a first port 126 and a second port 128. In operation, the first port 126 enables material 129 (e.g., cement, epoxy) to be pumped into the annulus 130 formed between the seals 110 and between the flexible pipe 10 and the carrier pipe 12. As the annulus 130 fills with the material 129, air within the annulus 130 escapes (e.g., releases) through a valve 132 (e.g., one-way valve, check valve). The material 129 is pumped or injected into the annulus from a material source 134 that couples to the first port 126 with a hose 136.

Figure 10:
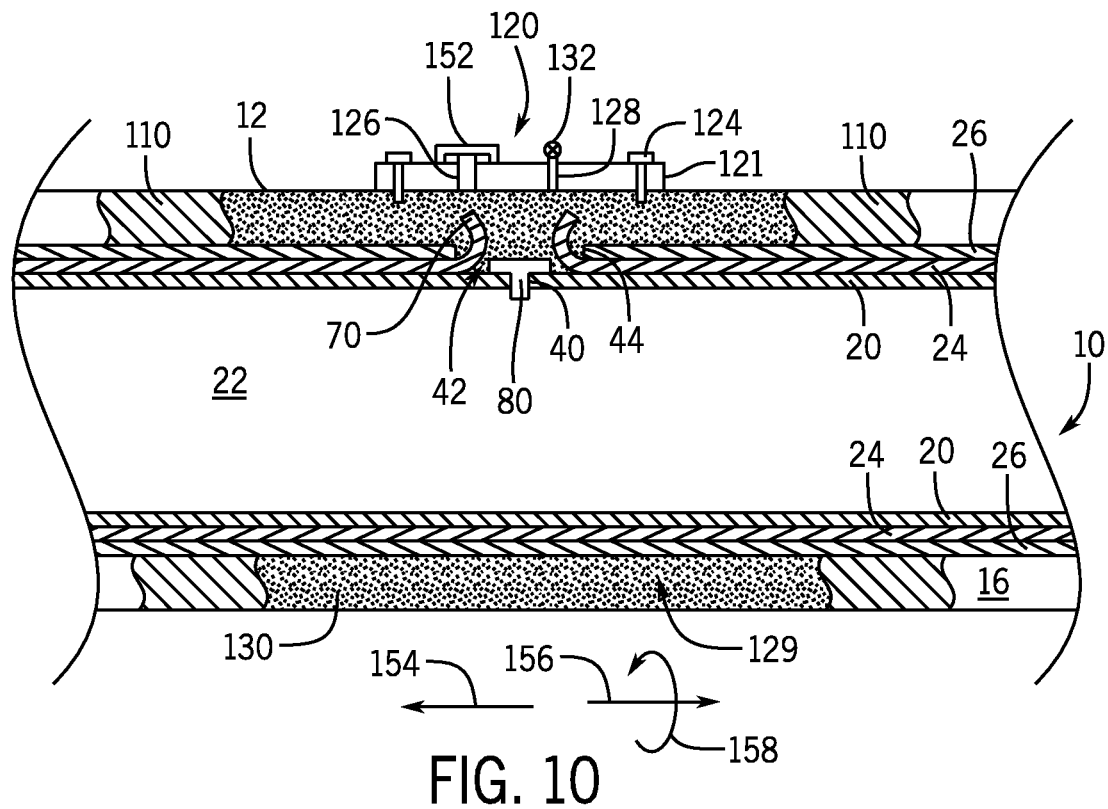
FIG. 10 is a cross-sectional side view of the flexible pipe within the carrier pipe seen in FIG. 9 with the annular space between the flexible pipe and the carrier pipe filled with a material, according to embodiments of the present disclosure.

FIG. 10 is a cross-sectional side view of the flexible pipe 10 within the carrier pipe 12 seen in FIG. 9 with the annulus 130 filled with the material 129. After injection of the material 129 into the annulus 130, the first port 126 may be sealed or closed with a cap 152 to block the escape of the material 129. The material 129 (e.g., cement, epoxy) may then cure within the annulus 130 providing a protective barrier around the hole 40 in the flexible pipe 10.

As explained above, the repair method involves bending the middle layer 24 (e.g., metal layer, metal strips) to form protrusions 70 that project away from the outer layer 26 and increase the size of the hole 42. Once the material 129 hardens in the annulus 130 and around the protrusions 70, the hardened material 129 interacts with the protrusions 70 to support tensile loads that act on the flexible pipe 10 in response to a pressurized fluid in the bore 22. In other words, the hardened material 129 blocks movement of the protrusions 70 in directions 154 and 156 as well as circumferentially in direction 158 in response to pressure loads. If not countered, excessive pressure loads around the hole 40 may enable fluid to escape the inner layer 20 of the flexible pipe 10.

Figure 11:
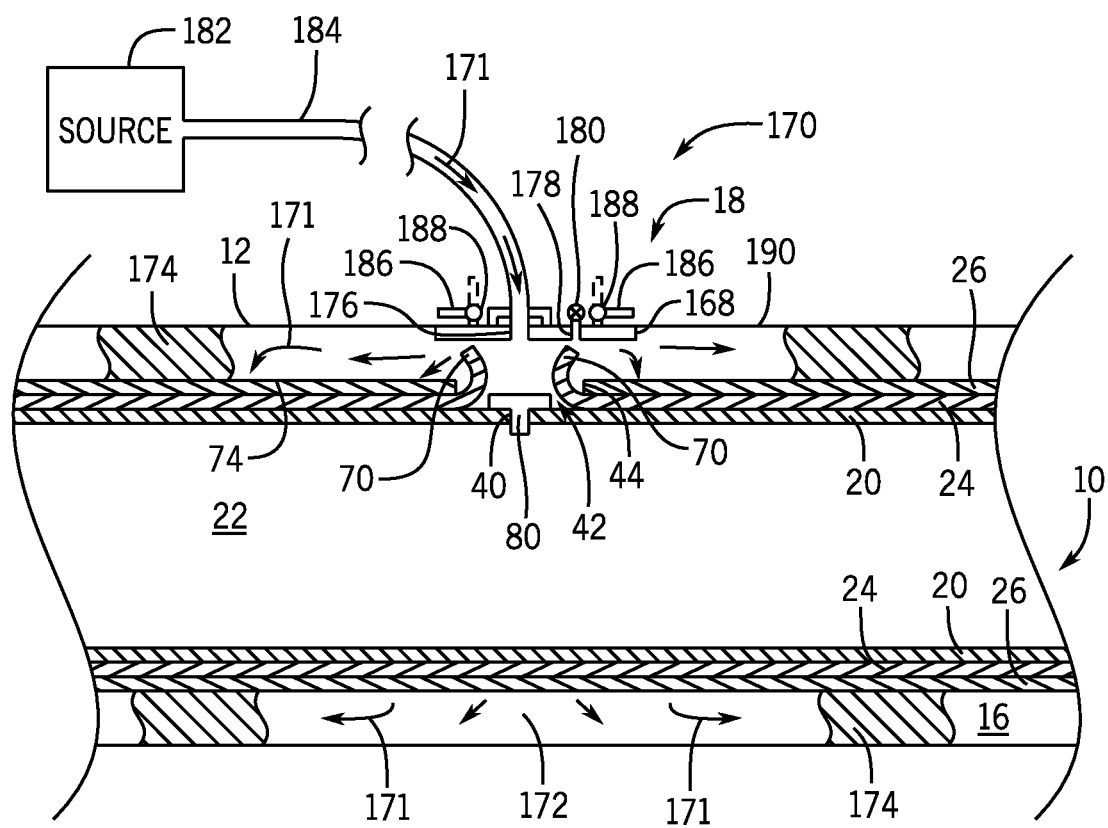
FIG. 11 is a cross-sectional side view of a flexible pipe within a carrier pipe seen in FIG. 5 with a seal system within an annular space between the flexible pipe and the carrier pipe, according to embodiments of the present disclosure.

FIG. 11 is a cross-sectional side view of the flexible pipe 10 within the carrier pipe 12 seen in FIG. 5 with a seal body 168 of a seal system 170 positioned within the carrier pipe 12. In operation, the seal system 170 enables a material 171 (e.g., epoxy, cement) to be pumped into an annulus 172 while simultaneously forming a seal about the hole 18 in the carrier pipe 12. The annulus 172 is circumferentially formed between the flexible pipe 10 and the carrier pipe 12 and longitudinally between the seals 174.

The seals 174 block or reduce the flow of the material 171 beyond a desired distance from the hole 40. The seals 174 are placed upstream and downstream from the hole 40 and circumferentially extend about the exterior surface 74 of the outer layer 26 to form a seal between the carrier pipe 12 and the flexible pipe 10. The seals 174 may be a rubber seal, a plastic seal, a foam seal, a swellable seal (e.g., absorbent polymer), among others.

Once the seals 174 are in place and have formed a seal between the flexible pipe 10 and the carrier pipe 12, the repair method continues by inserting the seal body 168 through the hole 18. After insertion, the seal body 168 is reoriented to cover the hole 18. The seal body 168 includes a first port 176 and a second port 178. In operation, the first port 176 enables the material 171 (e.g., cement, epoxy) to be pumped into the annulus 172 formed between the seals 174 and between the flexible pipe 10 and the carrier pipe 12. As the annulus 172 fills with the material 171, air within the annulus 172 is able to escape (e.g., release) through a valve 180 (e.g., one-way valve, check valve) coupled to the second port 178. The material 171 is pumped or injected into the annulus 172 from a material source 182 that couples to the first port 176 with a hose 184.

Prior to injection of the material 171, the seal body 168 is held in place using arms 186 that are pivotally coupled to the seal body 168 with a pivot joint 188. After inserting and orienting the seal body 168, the arms 186 are rotated from an upright position to an angled position that contacts the exterior surface 190 of the carrier pipe 12. In this way, the arms 186 suspend the seal body 168 inside the carrier pipe 12 while filling the annulus 172 with the material 171. In some embodiments, the seal body 168 may be suspended and held in place with straps or chains that couple to anchors on the seal body 168 until the material 171 fills the annulus 172 and blocks movement of the seal body 168.

Figure 12:
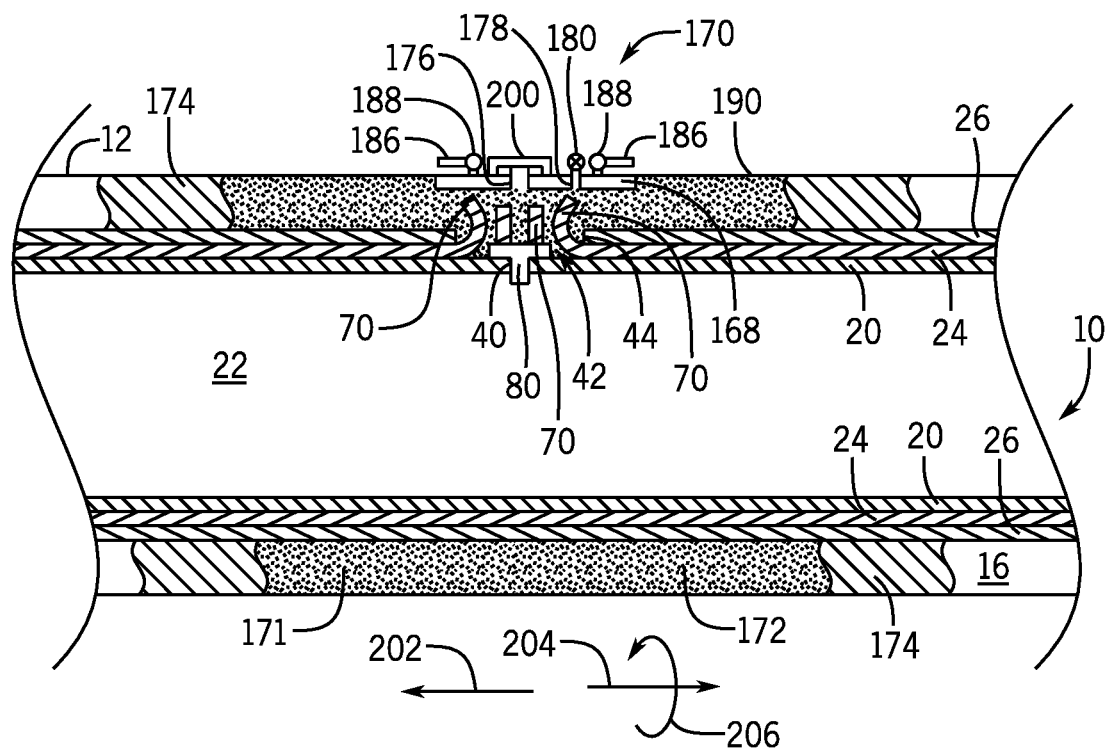
FIG. 12 is a cross-sectional side view of the flexible pipe within the carrier pipe seen in FIG. 11 with the annular space between the flexible pipe and the carrier pipe filled with a material, according to embodiments of the present disclosure.

FIG. 12 is a cross-sectional side view of the flexible pipe 10 within the carrier pipe 12 seen in FIG. 11 with the annulus 172 between the flexible pipe 10 and the carrier pipe 12 filled with the material 171. After injection of the material 171 into the annulus 172, the first port 176 may be sealed or closed with a cap 200 to block the escape of the material 171. The material 171 (e.g., cement, epoxy) may then cure within the annulus 172 providing a protective barrier around the hole 40 in the flexible pipe 10 as well blocking movement of the seal body 168.

As explained above, the repair method involves bending the middle layer 24 (e.g., metal layer, metal strips) to form protrusions 70 that project away from the outer layer 26 and increase the size of the hole 42. Once the material 171 hardens in the annulus 130 and around the protrusions 70, the hardened material 171 interacts with the protrusions 70 to support tensile loads that act on the flexible pipe 10 as a pressurized fluid flows through the bore 22. In other words, the hardened material 171 blocks movement of the protrusions 70 in directions 202 and 204 and circumferentially in direction 206 in response to pressure loading of the flexible pipe 10 from pressurized fluid flowing through the bore 22. By constraining movement of the protrusions 70, the material 171 reduces movement of the middle layer 24 (e.g., metal layer), which in turn blocks or reduces the hole 40 from increasing in size, which could enable fluid to escape.

Figure 13:
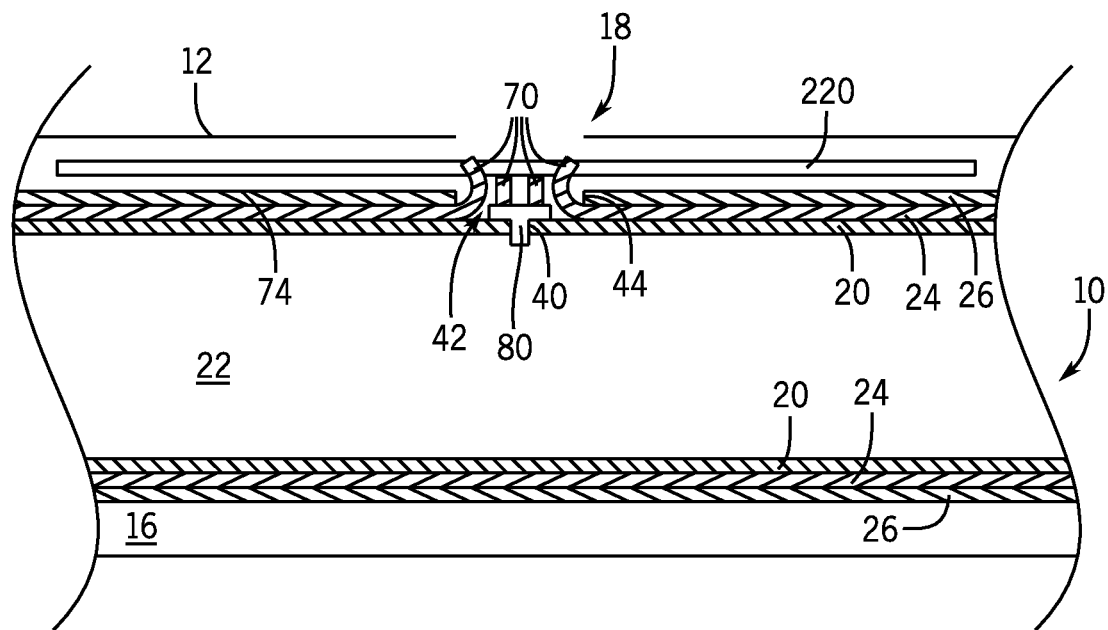
FIG. 13 is a cross-sectional side view of the flexible pipe within the carrier pipe seen in FIG. 5 with a leak detection pipe in the annular space between the flexible pipe and the carrier pipe, according to embodiments of the present disclosure.

FIG. 13 is a cross-sectional side view of the flexible pipe 10 within the carrier pipe 12 seen in FIG. 5. As explained above, fuel thieves may tap the carrier pipe 12 and flexible pipe 10 to access fuel carried in the bore 22. In order to detect these illegal tap(s), pressure sensing devices monitor the pressure within the bore 16 of the carrier pipe 12. These pressure sensing devices monitor fluctuations in the pressure of the bore 16. When a thief drills a hole in the carrier pipe 12, the pressure within the carrier pipe 12 rapidly equalizes with the pressure of the environment surrounding the carrier pipe 12. This change in pressure is detected by pressure sensing devices installed along the carrier pipe 12 enabling pipeline operators to rapidly detect and determine the location of the illegal tap. Unfortunately, if the bore 16 is sealed and filled with material (e.g., epoxy, cement) at one or more locations along the carrier pipe 12 pressure communication is interrupted. For example, the bore 16 may be sealed and filled from a previous repair of the flexible pipe 10, the pressure sensing devices may not detect additional illegal taps. The repair method may therefore include installing a leak detection pipe(s) 220 (e.g., 1, 2, 3, or more) in the bore 16 of the carrier pipe 12. In operation, the leak detection pipe 220 enables pressure communication across a repair site. In other words, fluid (e.g., air) may flow through the leak detection pipe 220 from a point downstream of the repair site to a position upstream from the repair site or vice versa enabling the transmission of pressure changes.

Figure 14:
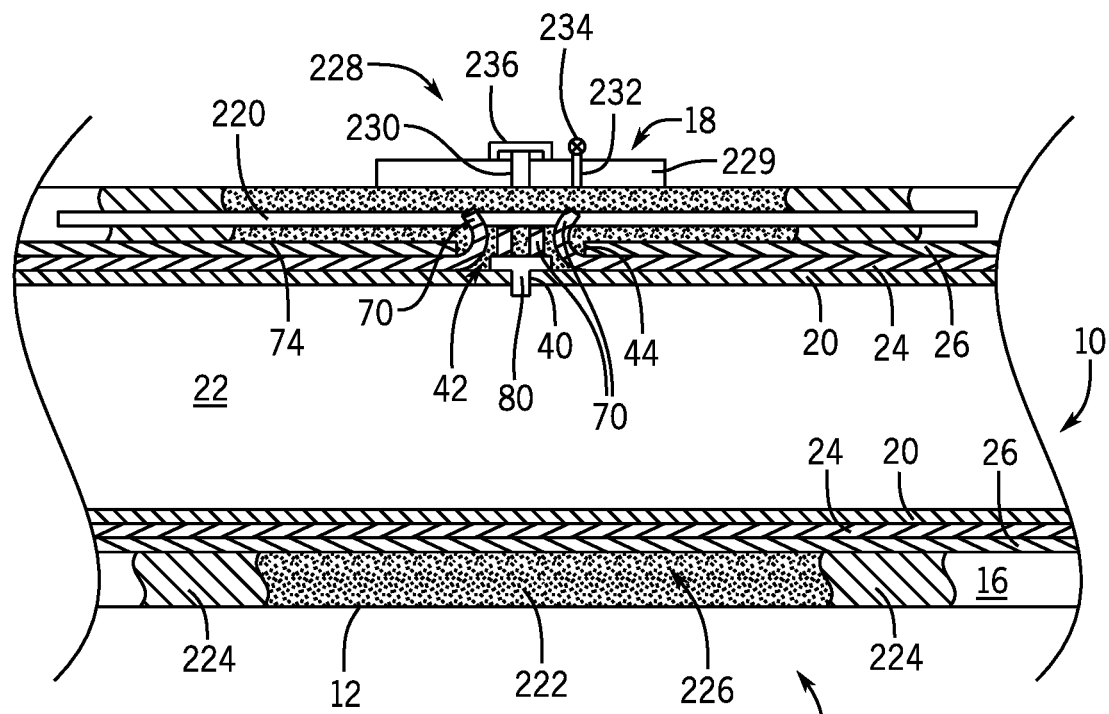
FIG. 14 is a cross-sectional side view of the flexible pipe within the carrier pipe seen in FIG. 13 with a leak detection pipe in the annular space between the flexible pipe and the carrier pipe and the annular space filled with a material, according to embodiments of the present disclosure.

FIG. 14 is a cross-sectional side view of the flexible pipe 10 within the carrier pipe 12 seen in FIG. 13 with the leak detection pipe 220 extending through an annular space 222 of the repair site 223. The annular space 222 is formed between the seals 224 and between the flexible pipe 10 and the carrier pipe 12. As illustrated, the leak detection pipe 220 extends through the seals 224 enabling fluid communication between upstream and downstream positions of the seals 224. As explained above, the annular space 222 is filled with a material 226 (e.g., epoxy, cement) by pumping the material 226 through a seal system 228. The material 226 encases and protects the leak detection pipe 220 through the repair site 223. The seal system 228 includes with seal body 229. The seal body 229 includes a first port 230 and a second port 232. In operation, the first port 230 enables the material 226 (e.g., cement, epoxy) to be pumped into the annular space 222 while also sealing the hole 18 in the carrier pipe 12. As the annular space 222 fills with the material 226, air within the annular space 222 is able to escape (e.g., release) through a valve 234 (e.g., one-way valve, check valve) coupled to the second port 232. After filling the annular space 222, the first port 230 is closed off with a cap 236. In this way, the repair method enables repair of the hole 40 while also enabling installation of a leak detection pipe 220.

Figure 15:
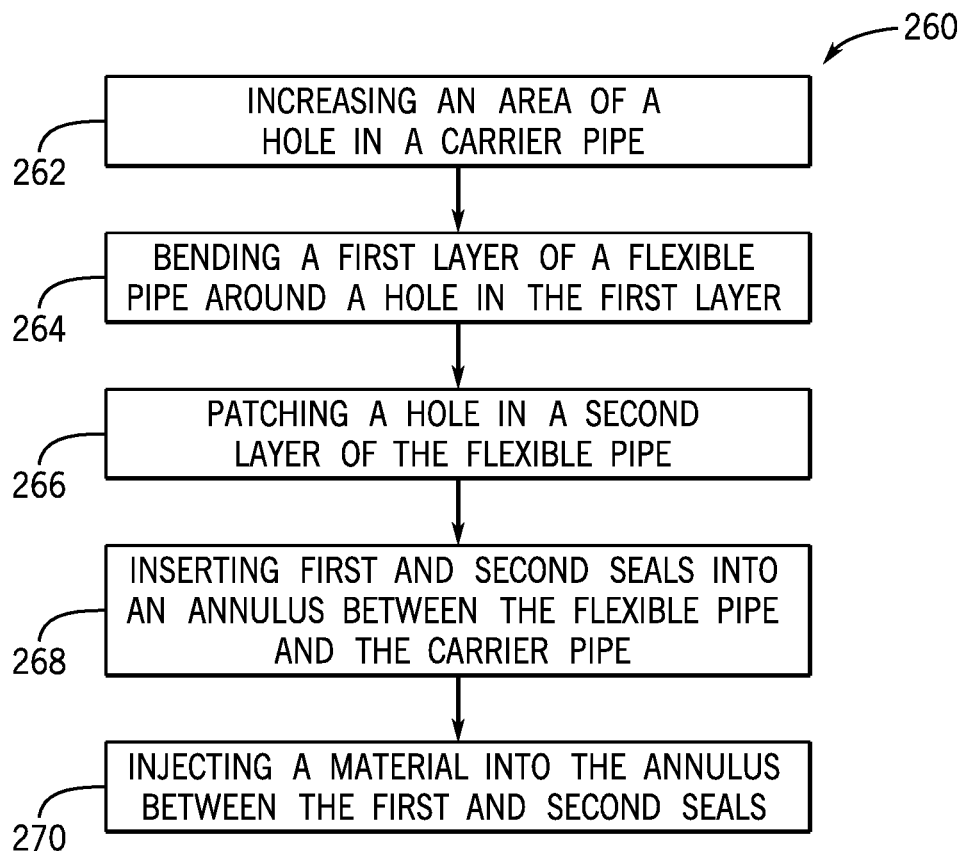
FIG. 15 is a flowchart of a method of repairing a hole in a flexible pipe, according to embodiments of the present disclosure.

FIG. 15 is a flowchart of a method 260 of repairing a hole in a flexible pipe (e.g., flexible pipe 10). The method 260 may begin by increasing an area of a hole in a carrier pipe (e.g., carrier pipe 12), step 262. Increasing the area of the hole in the carrier pipe facilitates access to the flexible pipe. After accessing the flexible pipe, the method 260 may bend a first layer (e.g., metal strip layer) of the flexible pipe away from a hole in the first layer, step 264. The method 260 then patches a hole in a second layer (e.g., inner layer 20) of the flexible pipe, step 266. After patching the hole in the second layer, first and second seals (e.g., seals 110) are placed in an annulus or annular space between the flexible pipe and the carrier pipe, step 268. With the seals in place, the method 260 injects material (e.g., concrete, epoxy) into the annulus between the seals to form a seal that holds the patch in place, step 270. The method 260 disclosed herein includes various steps represented by blocks. Although the flowchart illustrates the steps in a certain sequence, it should be understood that the steps may be performed in any suitable order and certain steps may be carried out simultaneously, where appropriate. Additionally, steps may be added to or omitted from the method 260. For example, the method 260 may include additional steps as described above in the description of FIGS. 2-14.

Technical effects of the invention include the ability to seal holes in a flexible pipe positioned within a carrier pipe.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of repairing a flexible pipe that is disposed within a bore of a carrier pipe, comprising:
    increasing an area of a first hole formed in the carrier pipe, wherein the first hole in the carrier pipe is aligned with a second hole formed in an outer layer of the flexible pipe, a third hole formed in a middle layer of the flexible pipe, and a fourth hole formed in an inner layer of the flexible pipe;
    bending material around the third hole in the middle layer of the flexible pipe via the first hole in the carrier pipe to increase an area of the third hole and to form one or more protrusions that extend beyond the outer layer of the flexible pipe; and
    patching the fourth hole in the inner layer of the flexible pipe via the third hole in the middle layer of the flexible pipe.

2. The method of claim 1, comprising sealing the first hole in the carrier pipe.

3. The method of claim 2, wherein sealing the first hole in the carrier pipe comprises coupling a seal system to the carrier pipe over the first hole.

4. The method of claim 1, wherein bending material around the third hole in the middle layer of the flexible pipe comprises bending a portion of a metal strip in the middle layer to form a protrusion that extends beyond the outer layer of the flexible pipe.

5. The method of claim 1, wherein patching the fourth hole in the inner layer of the flexible pipe comprises:
    electrofusing the inner layer of the flexible pipe;
    welding a patch over the fourth hole in the inner layer of the flexible pipe;
    inserting a plug into the fourth hole in the inner layer of the flexible pipe;
    placing a gasket over the fourth hole in the inner layer of the flexible pipe and securing a clamp to the flexible pipe over the gasket; or
    any combination thereof.

6. The method of claim 1, comprising drilling or trimming material around the fourth hole in the inner layer of the flexible pipe before patching the fourth hole in the inner layer.

7. The method of claim 1, comprising increasing area of the second hole in the outer layer of the flexible pipe via the first hole in the carrier pipe, wherein bending the material around the third hole in the middle layer of the flexible pipe comprises bending the material around the third hole in the middle layer of the flexible pipe via the second hole in the outer layer of the flexible pipe.

8. The method of claim 1, wherein increasing area of the first hole in the carrier pipe comprises cold cutting or hot cutting material around the first hole in the carrier pipe.

9. The method of claim 1, comprising:
    disposing a first seal within an annular space between the carrier pipe and the outer layer of the flexible pipe upstream of the fourth hole in the inner layer of the flexible pipe; and
    disposing a second seal within the annular space between the carrier pipe and the outer layer of the flexible pipe downstream of the third hole in the inner layer of the flexible pipe.

10. The method of claim 9, comprising:
    injecting another material into the annular space between the outer layer of the flexible pipe and the carrier pipe; and
    curing the other material within the annular space.

11. The method of claim 10, wherein injecting the other material into the annular space comprises injecting cement or epoxy into the annular space.

12. The method of claim 10, comprising placing a leak detection pipe into the annular space before injecting the other material into the annular space to facilitate detecting subsequent hole formation in the carrier pipe.

13. The method of claim 10, wherein curing the other material within the annular space comprises hardening the other material around the one or more protrusions formed in the middle layer to facilitate supporting tensile loads exerted on the flexible pipe.

14. The method of claim 9, wherein:
    disposing the first seal within the annular space comprises inserting a first foam seal or a first swellable seal into the annular space via the first hole in the carrier pipe; and disposing the second seal within the annular space comprises inserting a second foam seal or a second swellable seal into the annular space via the first hole in the carrier pipe.

15. The method of claim 9, wherein:
disposing the first seal within the annular space comprises:
   forming a first aperture in the carrier pipe upstream of the first hole in the carrier pipe; and
   inserting the first seal into the annular space via the first aperture in the carrier pipe; and
disposing the second seal within the annular space comprises:
   forming a second aperture in the carrier pipe downstream of the first hole in the carrier pipe; and
   inserting the second seal into the annular space via the second aperture in the carrier pipe.

16. A method of repairing a flexible pipe within a carrier pipe, comprising:
   increasing an area of a first hole in the carrier pipe;
   bending a first layer of the flexible pipe around a second hole in the first layer; and
   patching a third hole in a second layer of the flexible pipe.

17. The method of claim 16, comprising sealing the first hole in the carrier pipe.

18. The method of claim 16, wherein bending the first layer of the flexible pipe comprises bending portions of metal strips that form the first layer.

19. The method of claim 16, wherein patching the third hole comprises:
   electrofusing the second layer;
   welding a patch over the third hole;
   inserting a plug into the third hole;
   placing a gasket over the third hole and coupling a clamp to the flexible pipe over the gasket; or
   any combination thereof.

20. The method of claim 16, comprising:
   inserting a first seal upstream of the third hole and a second seal downstream of the third hole; and
   injecting a material into an annular space formed between the first seal, the second seal, the flexible pipe, and the carrier pipe.

* * * * *